United States Patent [19]

Bernauer et al.

[11] 4,310,601

[45] Jan. 12, 1982

[54] METAL HYDRIDE STORAGE DEVICE AND METHOD FOR ITS MANUFACTURE

[75] Inventors: Otto Bernauer, Weinstadt; Horst Baier; Helmut Buchner, both of Wendlingen, all of Fed. Rep. of Germany

[73] Assignee: Daimler-Benz Aktiengesellschaft, Stuttgart, Fed. Rep. of Germany

[21] Appl. No.: 101,845

[22] Filed: Dec. 10, 1979

[30] Foreign Application Priority Data

Dec. 22, 1978 [DE] Fed. Rep. of Germany ....... 2855476

[51] Int. Cl.³ .......................... B22F 5/00; F17C 11/00
[52] U.S. Cl. .................................... 428/566; 428/567; 75/200; 75/226; 75/222; 206/0.7
[58] Field of Search ................ 206/0.7; 428/566, 567; 75/200, 226, 222

[56] References Cited

U.S. PATENT DOCUMENTS 4,134,490  1/1979  Turillon et al. ....................... 206/0.7
4,134,491  1/1979  Turillon et al. ....................... 206/0.7

*Primary Examiner*—Brooks H. Hunt
*Attorney, Agent, or Firm*—Craig and Antonelli

[57] ABSTRACT

A metal hydride storage device with a hydrogenatable storage metal powder and with an encapsulation of non-hydrogenatable material receiving the storage metal powder; the storage metal powder with a substantially uniformly distributed addition of about 2 to 10% by weight of powder-shaped non-hydrogenatable material forming a matrix powder, is contained in the encapsulation as form-rigid compressed or sintered body.

28 Claims, 6 Drawing Figures

METAL HYDRIDE STORAGE DEVICE AND METHOD FOR ITS MANUFACTURE

The present invention relates to a metal hydride storage device with a hydrogenatable storage metal powder and with an encapsulation of non-hydrogenatable material for the storage metal powder as well as to a method for manufacturing such a metal hydride storage device.

Metal hydride storage devices may assume different tasks; in particular, they serve for the flammable storage of hydrogen. The metal adapted to be hydrogenated is thereby converted into a metal hydride by chemical linking or bonding of hydrogen, whereby the bonding or linking enthalpy is released in the form of heat. For releasing the hydrogen, the same heat quantity has to be supplied again.

Normally, a granulate of metal adapted to be hydrogenated or hydrided is charged into a pressure-resistant container of non-hydridable of non-hydrogenatable material. By reason of the volume expansion of more than 20% during the hydrogenation of the metal, it will gradually lead to a disintegration of the granulate. After a very large number of cycles of charging and discharging, the average granular size of the metal hydride lies between 8 and 20 $\mu$m. As a result of the down-trickling of the finer metal bodies inside of the granulate compound, it will lead to a collection and condensation of the metal powder at the bottom of the storage device. Since the powder fill or bulk does not behave like a liquid or paste, during volume expansion, it will not lead to a pushing up of the bulk inside the container corresponding to the volumetric expansion or it will lead only to a limited extent to such a pushing up of the bulk inside of the container corresponding to the volumetric expansion. Instead, the bulk will expand more and more at the bottom primarily in the width direction. As a result thereof, it will lead to a drop-shaped bulging of the container and finally to a destruction. Possibly, such a bulging process might be stopped by unacceptably large wall thicknesses. However, as a result thereof, the passive storage weight would become so large that the metal hydride storage device could no longer compete with other storage systems.

Applicants have heard about an alleged proposal to provide a support matrix in the form of a sponge structure for the active storage material. Since this support matrix, respectively, the hollow spaces thereof are formed prior to the filling with storage material, the hollow spaces thereof can be filled only incompletely and uncontrollably. By reason of the slight packing density of active storage material inside of the storage volume actually used—in relation to the storage capacity—not only the storage weight is very high because the support matrix must consist of good heat-conducting metal by reason of the heat transfer, but, above all, also the storage volume is very large.

It is the aim of the present invention to indicate a construction of metal hydride storage devices which, as regards weight and volume, permit the attainment of nearly the same storage densities as granulate storage devices in simple bulk form, which, however, on the other hand, do not have the self-destructive properties described above by reason of the granulate disintegration and the volume increase during the hydrogenation, respectively, dehydrogenation.

The underlying problems are solved according to the present invention in that the storage metal powder with a uniformly distributed admixture of about 2 to 10% by weight, preferably about 5% by weight of powder-shaped non-hydrogenatable metal (matrix powder), is contained in the encapsulation as form-resistant compressed or sintered body. The non-hydrogenatable matrix metal powder which at most has about the same grain size as the storage metal powder, is intimately mixed with the latter and is compressed by pressure into a form-stable body whereby the granules of the matrix powder are plastically deformed between the granules of the storage metal powder and together form a supporting cohesive support structure for the granules of the storage metal powder. By compressing together the active storage metal powder and a small percentage of intimately mixed non-hydridable or non-hydrogenatable matrix metal powder, the softer granules of the latter are plastically deformed between the granules of the storage metal powder in such a manner that they fill out the hollow spaces between the granules of the storage metal powder, whereby the microscopically shell-shaped squeezed granules of the matrix metal powder form with one another a cohesive, load-bearing support matrix for the storage metal granules. In order to be able to form such a support structure which itself only constitutes a small proportion by weight of the active storage material, a very fine pulverization both of the active storage material as also of the matrix material is necessary. The plastic deformation of the support material can also be achieved with isostatic compression of the powder mixture and at pressures of a few thousand bars.

A compressed blank constructed in this manner is itself form-stable and offers an increased resistance against disintegration of the storage material powder inside of the support structure also with frequently repeated charge and discharge cycles of the metal hydride storage device. The length of life of such a storage device can be additionally increased by a simultaneous or subsequent sintering of the plastically deformed granules of the matrix metal powder. The sintering temperature should thereby be so chosen that exclusively the granules of the matrix metal powder pass over into the plastic condition whereas the granules of the storage metal powder are not liquefied.

Owing to the use of such a form-resistant or form-stable structure for the storage material, the latter can be encapsulated in a relatively thin-walled container whereby also weight and structural volume can be economized. Depending on whether and at what temperature level heat is to be supplied from the outside or to be carried off toward the outside, a fiber-reinforced plastic material or a metallic encapsulation may be used. With metallic encapsulations which may consist of steel, aluminum or copper, one may utilize a loose, though substantially flush, insertion of the form-resistant structure into the encapsulation, a sintering-in of this structure within the encapsulation, or a casting of the encapsulation about the form-rigid structure.

Accordingly, it is an object of the present invention to provide a metal hydride storage device and a method of manufacturing the same which avoid by simple means the aforementioned shortcomings and drawbacks encountered in the prior art.

Another object of the present invention resides in a metal hydride storage device which is safe in operation, yet obviates the need for excessively strong and therewith heavy container walls.

A further object of the present invention resides in a metal hydride storage device which is able to compete with other storage systems as regards weight and volume.

Still a further object of the present invention resides in a metal hydride storage device and method of making the same which assures long length of life in conjunction with relatively high efficiency of operation.

Another object of the present invention resides in a metal hydride storage device which can be constructed of relatively low weight and small volume without impairment of its efficacy.

Still a further object of the present invention resides in a metal hydride storage device and to a method of making the same which effectively eliminates the self-destructing properties by reason of granulate disintegration, yet achieves substantially the same storage densities as attainable with simple bulk material.

These and other objects, features and advantages of the present invention will become more apparent from the following description when taken in connection with the accompanying drawing which shows, for purposes of illustration only, two embodiments in accordance with the present invention, and wherein.

Figure 1:
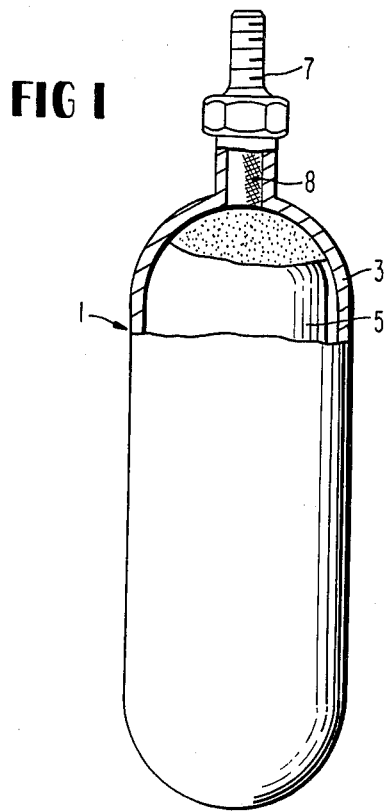
FIG. 1 is a side elevational view, partly in cross section, of a first embodiment of a metal hydride storage device according to the present invention.

Referring now to the drawing wherein like reference numerals are used throughout the various views to designate like parts, in the embodiment illustrated in FIG. 1 of a metal hydride storage device generally designated by reference numeral 1, a form-rigid storage body 5 is installed in a gas-tight and heat-conducting manner in an encapsulation 3 of non-hydrogenatable or non-hydridable material. The encapsulation 3 includes a connection 7, in the area of which is arranged a dust filter 8 for retaining loose metal dust particles from the storage body 5. Its pore cross section must be dimensioned correspondingly smaller by an order of magnitude than the smallest grain size of the granules of metal powder processed or used in the storage body 5.

The form-rigid storage body 5 can be charged completely prior to its installation into an encapsulation, i.e., its storage active components can be transformed fully into the hydrided or hydrogenated condition. By reason of the volume expansion of the granules of the storage metal powder which occur during the hydrogenation, which may amount up to 20%, it will lead to a corresponding plastic enlargement and deformation of the support structure. The initial deformation of the support structure during the first charging of the storage body remains preserved also after the subsequent discharge of the storage device by reason of its plastic character; the storage-active metal granules retained by the support structure shrink together during the hydrogenation by themselves without thereby exerting any forces on the support structure. The support structure, in whose hollow spaces the dehydrogenated granules of the storage metal powder are partially loosely retained, retains its original form and its original dimensions regardless of the volume changes of the storage-active material.

In those cases in which a storage body is installed into the encapsulation without thermally adduced linking or bonding with the wall thereof, such an initial charging and a corresponding volume enlargement of the support structure must have preceded in order not to burst the encapsulation.

Figure 3:
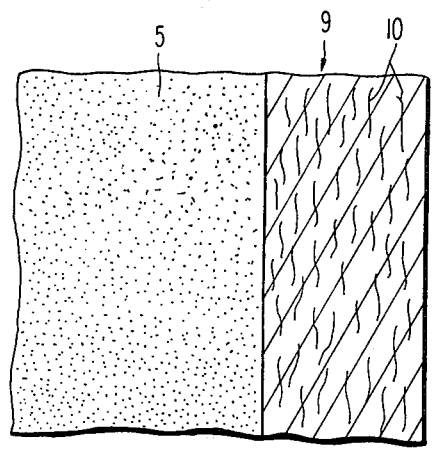
FIG. 3 is a partial cross-sectional view, on a greatly enlarged scale, of a metal hydride storage device within the area of the wall of the encapsulation made of fiber-reinforced plastic material in accordance with the present invention.

The encapsulation 3 illustrated in FIG. 1 may also be welded together from correspondingly shaped sheet-metal structure parts, whereby the sheet-metal parts may consist of steel, of copper or of aluminum. In lieu of a metallic material, also a fiber-reinforced synthetic plastic material may be used according to the illustration of FIG. 3 for the walls generally designated by reference numeral 9 of an encapsulation, whereby the reinforcing fibers 10 may consist of glass fibers or of carbon fibers. Fiber-reinforced synthetic resinous material offers the advantages of a high strength and of a low weight. With the use of fiber-reinforced synthetic plastic encapsulations about the storage body 5, a heat transfer from the outside, respectively, toward the outside through the synthetic plastic wall may be adduced, because, depending on the used hydrogenatable metal, the heat transfer may also take place at such temperatures which can be withstood without difficulty by the synthetic plastic material. However, by reason of the material-conditioned limited temperature drop which can be permitted during the heat transfer, the heat quantity passing per unit time through the outer wall and thus the hydrogen quantity released, respectively, linked per unit time is relatively slight. By reason of the fiber reinforcement of the walls of the encapsulation, the latter, however, can be constructed relatively thin so that notwithstanding the relatively small heat conductivity, the thermal resistance of such a synthetic plastic wall is only small. Additionally, the possibility exists to increase the heat conductivity of synthetic plastic material by embedding therein metal powders or the like. However, it would be better with hydride storage devices encapsulated in synthetic plastic materials to compress at the same time a cooling pipe system into the compressed or sintered body, by way of which the linking enthalpy can be supplied, respectively, removed—from the inside so to speak of.

Figure 2:
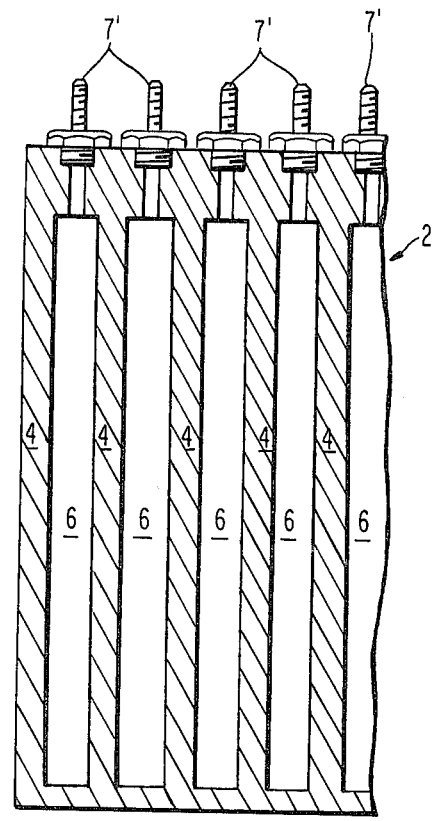
FIG. 2 is a cross-sectional view through another embodiment of a metal hydride storage device according to the present invention.

In the embodiment of a metal hydride storage device 2 illustrated in FIG. 2, several rod-shaped storage bodies 6 are cast about with an encapsulation 4 consisting preferably of aluminum. A gas connection 7' for each of the individual storage bodies is arranged at the head of a thus-constructed metal hydride storage device which may be combined by way of a corresponding manifold into a common connection. By casting around the fully charged storage body 6, it may lead to a partial discharge by reason of the heat supply from the liquid wall material. This, however, is only of insignificant influence for the form rigidity of the support structure. By casting such a material about the storage form bodies, as coincides with the material of the support matrix, the wall material combines with the support matrix into an intimately good heat-conducting connection. As a result thereof, a rapid heat flow from the wall into the interior of the support structure as well as in the reverse direction takes place. This favors a rapid and uniform discharging, respectively, charging of the storage device.

Figure 4:
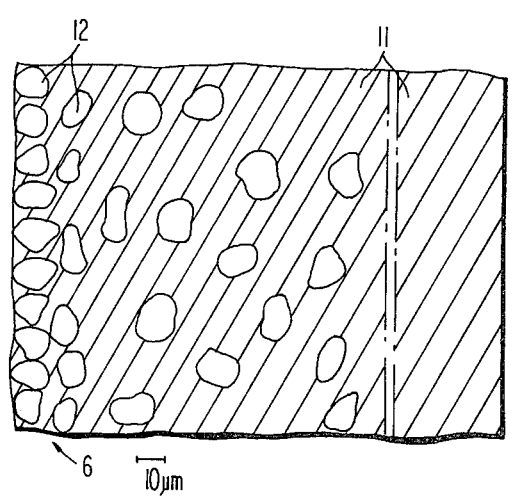
FIG. 4 is a partial cross-sectional view, similar to FIG. 3, through an encapsulation obtained by casting or molding around the storage device.

The microscopic illustration of FIG. 4 shows this feature. The corresponding cross section is taken from the transition area between the metal wall 11 and the outer area of the storage body 6, whereby the individual storage-active metal granules 12 can be recognized. With the cast-about storage bodies, no sharp boundary will result between the storage granules 12 carried by a support structure inside of the storage body, on the one hand, and by the wall 11, on the other. Instead, the support structure is melted or fused within the edge area of the storage form body by the casting about with an identical material and the storage granules 12 disposed in the edge area migrate more or less far into the interior of the still molten liquid wall material.

Figure 5:
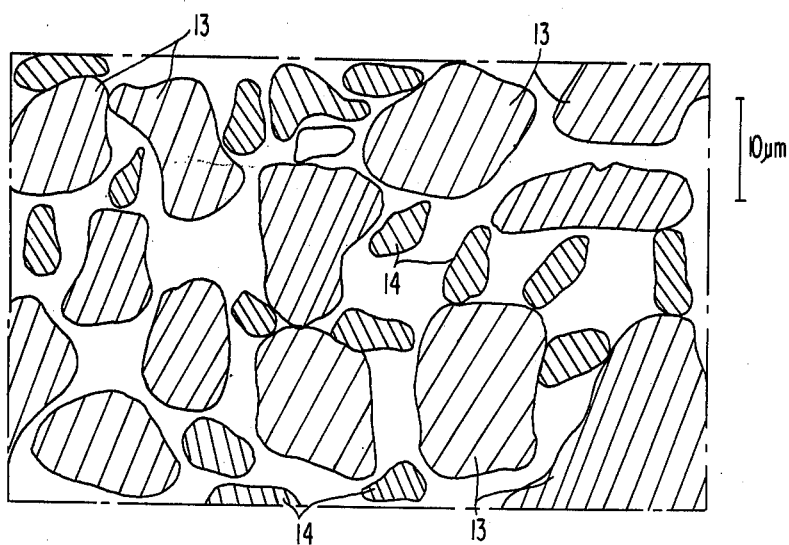
FIG. 5 is a partial cross-sectional view, on a greatly enlarged scale, through a powder bulk in still loose condition for producing a metal hydride storage device according to the present invention.
Figure 6:
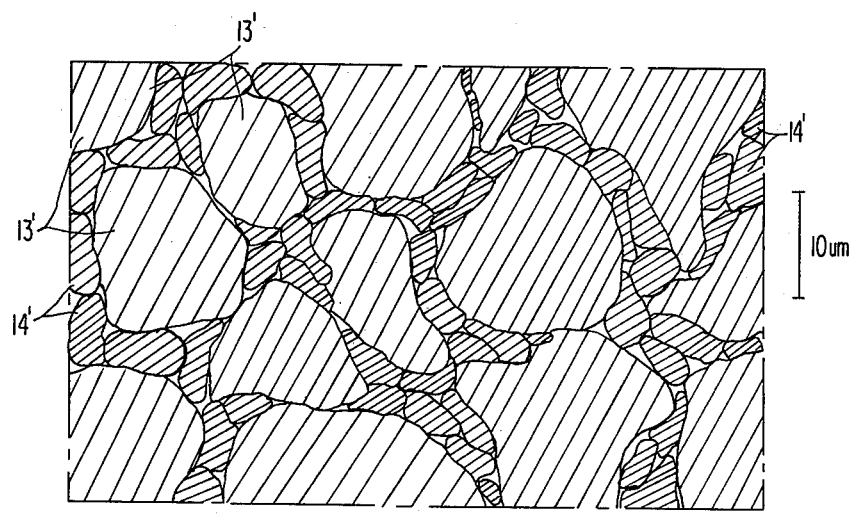
FIG. 6 is a partial cross-sectional view, similar to FIG. 5, and illustrating the powder mixture thereof in the compressed condition thereof.

The comparison of the two FIGS. 5 and 6 which also represent microscopic enlargements, shows the creation of the support structure according to the present invention. FIG. 5 illustrates a still loose mixture of metal granules 13 of storage-active material and of other granules 14 of non-hydrogenatable metal. The granules of the non-hydrogenatable metal powder are smaller than the granules of the storage-active material and surround the latter uniformly by reason of an intimate mixing.

The granules of the matrix metal powder are plastically deformed by an isostatic compression which may take place with simultaneous application of heat in such a manner that the granules of the storage-active material are surrounded on all sides and far-reachingly completely by a cohesive, interconnected thin layer which is formed of more or less strongly compressed or sintered-together small particles 14' and which together form a load-bearing and form-rigid support structure for the storage-active granules. The storage-active granules are also somewhat deformed and rounded-off by the pressing operation and by a possibly simultaneous or subsequent sintering operation. However, a form-rigid storage body which is constructed in such a manner, between the granules 13' of storage-active material and the granules 14' of the support matrix includes an interconnected pore and channel system extending over the entire storage body, which serves for a free and efficient gas exchange.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A metal hydride storage device with a hydrogenatable storage metal powder and with an encapsulation means of non-hydrogenatable material receiving the storage metal powder, characterized in that the storage metal powder with a substantially uniformly distributed admixture of about 2 to about 10% by weight of a non-hydrogenatable material in powder form forming a matrix powder, in the form of a form-rigid body, is contained in the encapsulation means, whereby increased resistance to disintegration of the storage metal powder is achieved.

2. A metal hydride storage device according to claim 1, characterized in that the form-rigid body is a compressed body of said storage metal powder and said non-hydrogenatable material in powder form.

3. A metal hydride storage device according to claim 1, characterized in that the form-rigid body is a sintered body of said storage metal powder and said non-hydrogenatable material in powder form.

4. A metal hydride storage device according to claim 1, 2, or 3, with a connection for the supply or removal of hydrogen, characterized in that a dust filter means having a pore size smaller than the grain size of the storage metal powder or non-hydrogenatable material in powder form is arranged within the area of the connection.

5. A metal hydride storage device according to claim 1, 2 or 3, characterized in that the encapsulation means consists of a metal.

6. A metal hydride storage device according to claim 5, characterized in that the metal is selected from the group consisting of steel, copper and aluminum.

7. A metal hydride storage device according to claim 1, 2 or 3, characterized in that the encapsulation means consists of a fiber-reinforced synthetic plastic material.

8. A metal hydride storage device according to claim 1, 2 or 3, characterized in that the encapsulation means is sintered together with the sintered body of storage metal powder and matrix metal.

9. A metal hydride storage device according to claim 1, 2, or 3, characterized in that at least one form-rigid body of storage metal powder and non-hydrogenatable material in powder form is cast about with aluminum as encapsulation means.

10. A method for manufacturing a metal hydride storage device which contains a hydrogenatable storage metal powder in an encapsulation of non-hydrogenatable material, comprising the steps of intimately mixing storage metal powder of a grain size of about 8 to about 20 $\mu$m with about 2 to 10% by weight of a non-hydrogenatable matrix metal powder of at most approximately the same grain size, compressing the mixture into a form-rigid body, whereby the granules of the matrix metal powder are plastically deformed between the granules of the storage metal powder and together form a load-bearing cohesive support structure for the granules of the storage metal powder, and encapsulating the form-rigid body in said encapsulation of non-hydrogenatable material, whereby increased resistance to disintegration of the storage metal powder is achieved.

11. A method according to claim 10, characterized in that about 5% by weight of non-hydrogenatable matrix metal powder are mixed together with the storage metal powder.

12. A method according to claim 10, characterized in that during the manufacture, pressure and heat of such a temperature are used at which exclusively the granules of the matrix metal powder will become soft.

13. A method according to claim 12, characterized in that the pressure and heat is used after the step of compressing the powder mixture.

14. A method according to claim 12, characterized in that the pressure and heat is used during the step of compressing the powder mixture.

15. A method according to claim 10, 11 or 12, characterized in that one of aluminum and copper is used as matrix metal.

16. A method according to claim 15, characterized in that the form-rigid body is compressed in an encapsulation of the same material as the matrix metal powder.

17. A method according to claim 15, characterized in that the form-rigid body is sintered in an encapsulation of the same material as the matrix metal powder.

18. A method according to claim 15, characterized in that the form-rigid body is cast about with an encapsulation of the same material as the matrix metal powder.

19. A method according to claim 10, 11 or 12, characterized in that the form-rigid body is compressed in an encapsulation of the same material as the matrix metal powder.

20. A method according to claim 10, 11 or 12, characterized in that the form-rigid body is sintered in an encapsulation of the same material as the matrix metal powder.

21. A method according to claim 10, 11 or 12, characterized in that the form-rigid body is cast about with an encapsulation of the same material as the matrix metal powder.

22. A metal hydride storage device according to claim 1, 2, or 3, characterized in that said storage metal powder is admixed with about 5% by weight of said non-hydrogenatable material in powder form.

23. A metal hydride storage device according to claim 2, characterized in that said non-hydrogenatable material in powder form is softer than said storage metal powder, whereby in said compressed body the granules of said non-hydrogenatable material in powder form are plastically deformed to occupy the hollow spaces between the storage metal powder and form a load-bearing support matrix for the storage metal powder.

24. A metal hydride storage device according to claim 7, characterized in that said fiber-reinforced plastic has metal particles embedded therein to increase the heat conductivity of said plastic.

25. A metal hydride storage device according to claim 9, characterized in that a plurality of form-rigid bodies are cast about with aluminum.

26. A metal hydride storage device according to claim 1, 2, or 3, characterized in that the material of the encapsulation means is the same as the non-hydrogenatable material in powder form.

27. A method according to claim 10, 11, or 12, characterized in that the matrix metal powder is softer than the storage metal powder.

28. A method according to claim 10, 11, or 12, characterized in that the rigid-form body is charged with hydrogen prior to being encapsulated.

* * * * *